United States Patent
Thorat et al.

(10) Patent No.: US 11,762,816 B2
(45) Date of Patent: Sep. 19, 2023

(54) STORING VARIATIONS OF DATA ACROSS DIFFERENT REPLICATION SITES

(71) Applicant: International Business Machines Corporation, Armonk, NY (US)

(72) Inventors: Pushkaraj Balasaheb Thorat, Pune (IN); Sandeep Naik, Pune (IN); Sasikanth Eda, Vijayawada (IN); Shashank Shingornikar, Pune (IN); Digvijay Ukirde, Pune (IN)

(73) Assignee: International Business Machines Corporation, Armonk, NY (US)

( * ) Notice: Subject to any disclaimer, the term of this patent is extended or adjusted under 35 U.S.C. 154(b) by 38 days.

(21) Appl. No.: 17/341,202

(22) Filed: Jun. 7, 2021

(65) Prior Publication Data
US 2022/0391362 A1     Dec. 8, 2022

(51) Int. Cl.
*G06F 16/182*     (2019.01)
*G06F 16/16*     (2019.01)
*G06F 11/34*     (2006.01)
*H04L 29/08*     (2006.01)

(52) U.S. Cl.
CPC ...... *G06F 16/1844* (2019.01); *G06F 11/3419* (2013.01); *G06F 16/164* (2019.01)

(58) Field of Classification Search
CPC . G06F 16/1844; G06F 11/3419; G06F 16/164
See application file for complete search history.

(56) References Cited

U.S. PATENT DOCUMENTS

| | | | |
|---|---|---|---|
| 10,528,262 | B1 | 1/2020 | Shmuylovich et al. |
| 10,585,856 | B1 | 3/2020 | Bigman |
| 2017/0277456 | A1 | 9/2017 | Kato et al. |
| 2018/0165584 | A1 | 6/2018 | Jha et al. |
| 2021/0026537 | A1* | 1/2021 | Zhang ..................... G06F 3/067 |
| 2021/0303409 | A1* | 9/2021 | Seshadri ............. G06F 11/1451 |

(Continued)

OTHER PUBLICATIONS

Anonymous, "NIST Cloud Computing Program," NIST, Information Technology Laboratory, Nov. 13, 2013, pp. 1-2, retrieved from www.nist.gov/itl/cloud/.

(Continued)

*Primary Examiner* — Hosain T Alam
*Assistant Examiner* — Chongsuh Park
(74) *Attorney, Agent, or Firm* — Zilka-Kotab, P.C.

(57) ABSTRACT

A computer-implemented method according to one embodiment includes determining patterns of an application that utilizes a filesystem and/or properties of queries of the application. Data of the filesystem is stored across a plurality of replication sites of a data storage system. Based on the determined patterns of the application and/or the determined proper-ties of the queries of the application, a utility of storing at least some of the data of the filesystem in different variations at more than one of the replication sites is estimated. The estimated utility is compared against a predetermined utility threshold, and in response to a determination that the estimated utility is greater than the predetermined utility threshold, a write system call offered by the filesystem is modified to store the data in different variations at more than one of the replication sites.

20 Claims, 8 Drawing Sheets

(56) References Cited

U.S. PATENT DOCUMENTS

2021/0303631 A1* 9/2021 Grebenisan .......... G06K 9/6256

OTHER PUBLICATIONS

Mell et al., "The NIST Definition of Cloud Computing," Version 15, Oct. 7, 2009, pp. 1-2.
Mell et al., "The NIST Definition of Cloud Computing," Recommendations of the National Institute of Standards and Technology, NIST Special Publication 800-145, Sep. 2011, pp. 1-7.
CSRC, "Cloud Computing," Computer Security Resource Center, Oct. 2017, 3 pages, retrieved from https://csrc.nist.gov/projects/cloud-computing.
IBM, "Data Mirroring and Replication," IBM Spectrum Scale, 2019, 3 pages, retrieved from https://www.ibm.com/docs/en/spectrum-scale/5.0.3?topic=administering-data-mirroring-replication.
VOLTDB, "The Psychology of Waiting Survey Report—The Business Impact of Diminishing Consumer Patience," VoltDB, Inc., 2021, 2 pages, retrieved from https://www.voltdb.com/file/report-psychology-waiting-survey/.
IBM, "Queries," IBM InfoSphere Information Server, 2015, 5 pages, retrieved from https://www.ibm.com/docs/en/is/9.1?topic=repository-queries.

* cited by examiner

| Name | ID |
|---|---|
| Amrut | 14 |
| Shloka | 13 |
| Ved | 15 |

FIG. 6A

Copy 1: Sorted by Name

| Name | ID |
|---|---|
| Amrut | 14 |
| Shloka | 13 |
| Ved | 15 |

Copy 2: Sorted by ID

| Name | ID |
|---|---|
| Shloka | 13 |
| Amrut | 14 |
| Ved | 15 |

FIG. 6B

STORING VARIATIONS OF DATA ACROSS DIFFERENT REPLICATION SITES

BACKGROUND

The present invention relates to filesystems, and more particularly, this invention relates to filesystem data storage at replication sites in cloud storage systems and networks. File systems may exist and be shared at more than one physical location where the file system is mounted on multiple servers. One specific type of such a shared file system includes a clustered file system. Clustered filesystems provide several features that facilitate the implementation of highly-available storage environments capable of withstanding catastrophic hardware failures. For example, data of a filesystem may be replicated in three exact copies that each are stored at different locations. By maintaining a replica of the data at different locations, e.g., disks, racks, geographically-separate locations, etc., processing of the system may be sustained using the secondary, tertiary replicas of the data in the event of a total failure in the primary replica. In some conventional techniques, different replicas of the same data are maintained by, e.g., synchronous mirroring utilizing filesystem-based replication, synchronous mirroring utilizing storage and/or underlying Storage Area Network (SAN) based replication, asynchronous mirroring utilizing filesystem-based replication, asynchronous mirroring utilizing storage and/or underlying SAN based replication, point in time copy using storage and/or underlying SAN based functionality, etc.

BRIEF SUMMARY

A computer-implemented method according to one embodiment includes determining patterns of an application that utilizes a filesystem and/or properties of queries of the application. Data of the filesystem is stored across a plurality of replication sites of a data storage system. Based on the determined patterns of the application and/or the determined proper-ties of the queries of the application, a utility of storing at least some of the data of the filesystem in different variations at more than one of the replication sites is estimated. The estimated utility is compared against a predetermined utility threshold, and in response to a determination that the estimated utility is greater than the predetermined utility threshold, a write system call offered by the filesystem is modified to store the data in different variations at more than one of the replication sites.

A computer program product according to another embodiment includes a computer readable storage medium having program instructions embodied therewith. The program instructions are readable and/or executable by a computer to cause the computer to perform the foregoing method.

A system according to another embodiment includes a processor, and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 6A is a representation of records of a data storage system, in accordance with one embodiment.

FIG. 6B is a representation of two copies of the records of FIG. 6A, in accordance with one embodiment.

DETAILED DESCRIPTION

Figure 1:
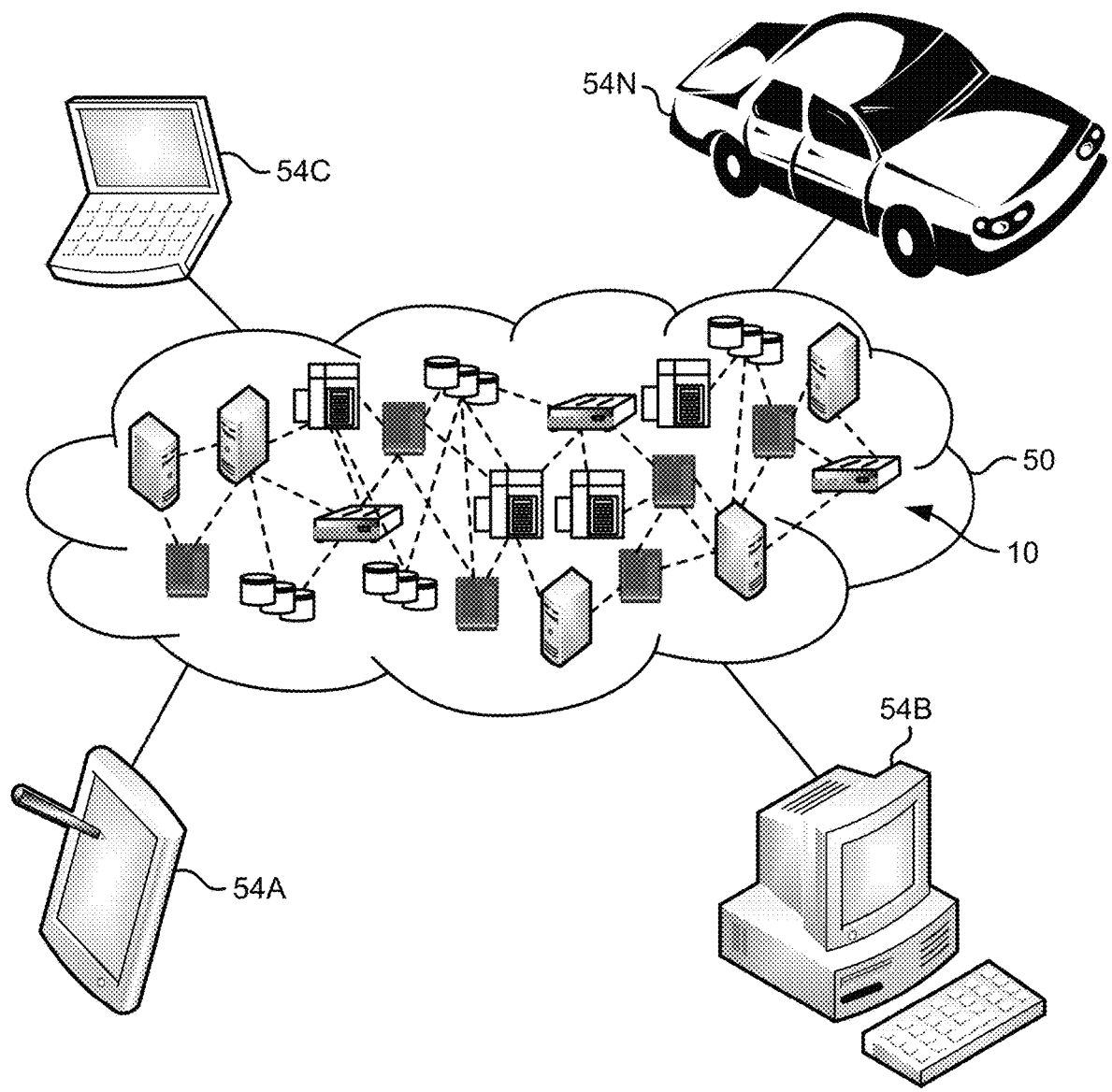
FIG. 1 depicts a cloud computing environment, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several embodiments of storing variations of data across different replication sites.

In one general embodiment, a computer-implemented method includes determining patterns of an application that utilizes a filesystem and/or properties of queries of the application. Data of the filesystem is stored across a plurality of replication sites of a data storage system. Based on the determined patterns of the application and/or the determined proper-ties of the queries of the application, a utility of storing at least some of the data of the filesystem in different variations at more than one of the replication sites is estimated. The estimated utility is compared against a predetermined utility threshold, and in response to a determination that the estimated utility is greater than the predetermined utility threshold, a write system call offered by the filesystem is modified to store the data in different variations at more than one of the replication sites.

In another general embodiment, a computer program product includes a computer readable storage medium having program instructions embodied therewith. The program instructions are readable and/or executable by a computer to cause the computer to perform the foregoing method.

In another general embodiment, a system includes a processor, and logic integrated with the processor, executable by the processor, or integrated with and executable by the processor. The logic is configured to perform the foregoing method.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
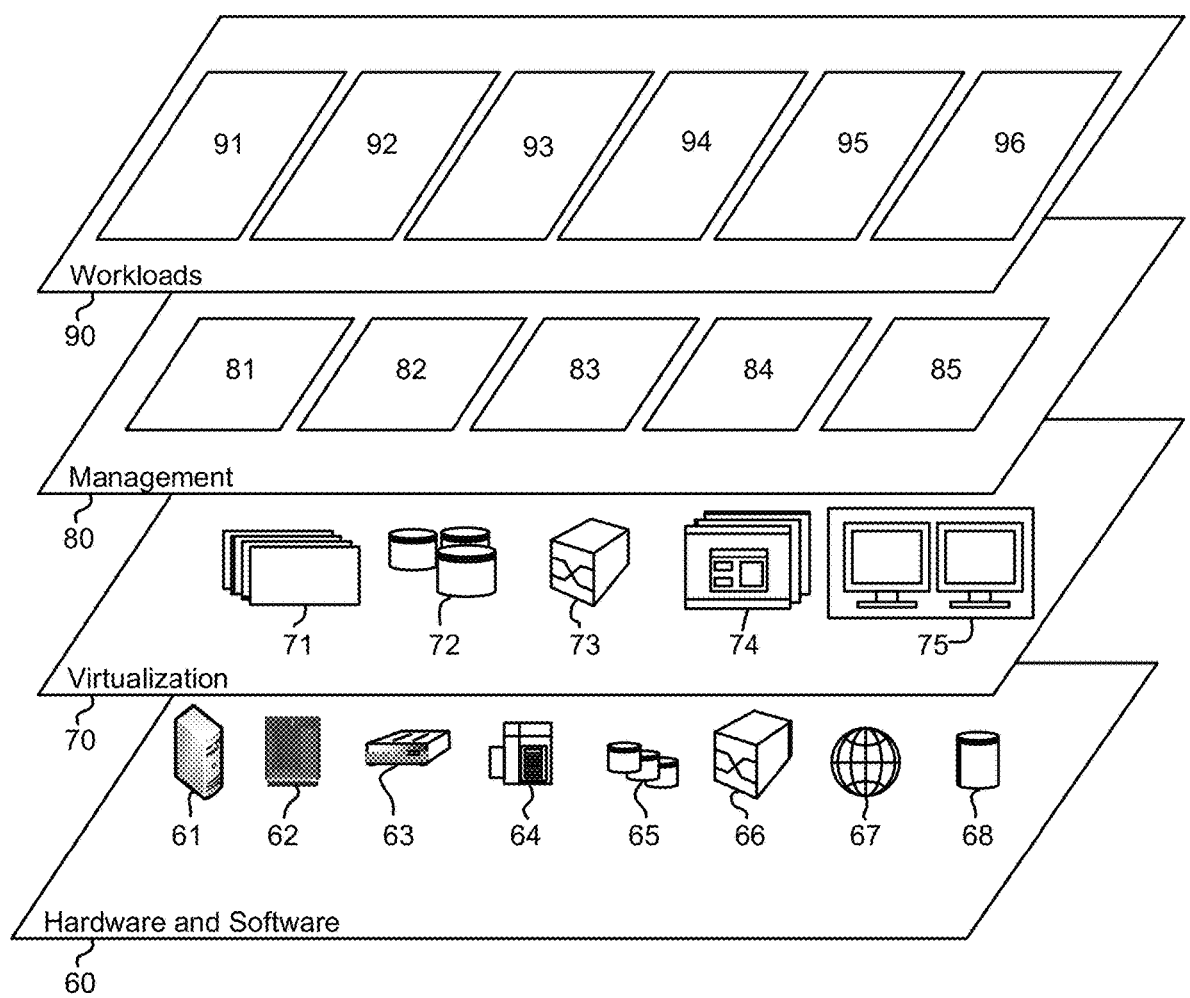
FIG. 2 depicts abstraction model layers, in accordance with one embodiment.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and modifying a write system call offered by a filesystem 96.

Figure 3:
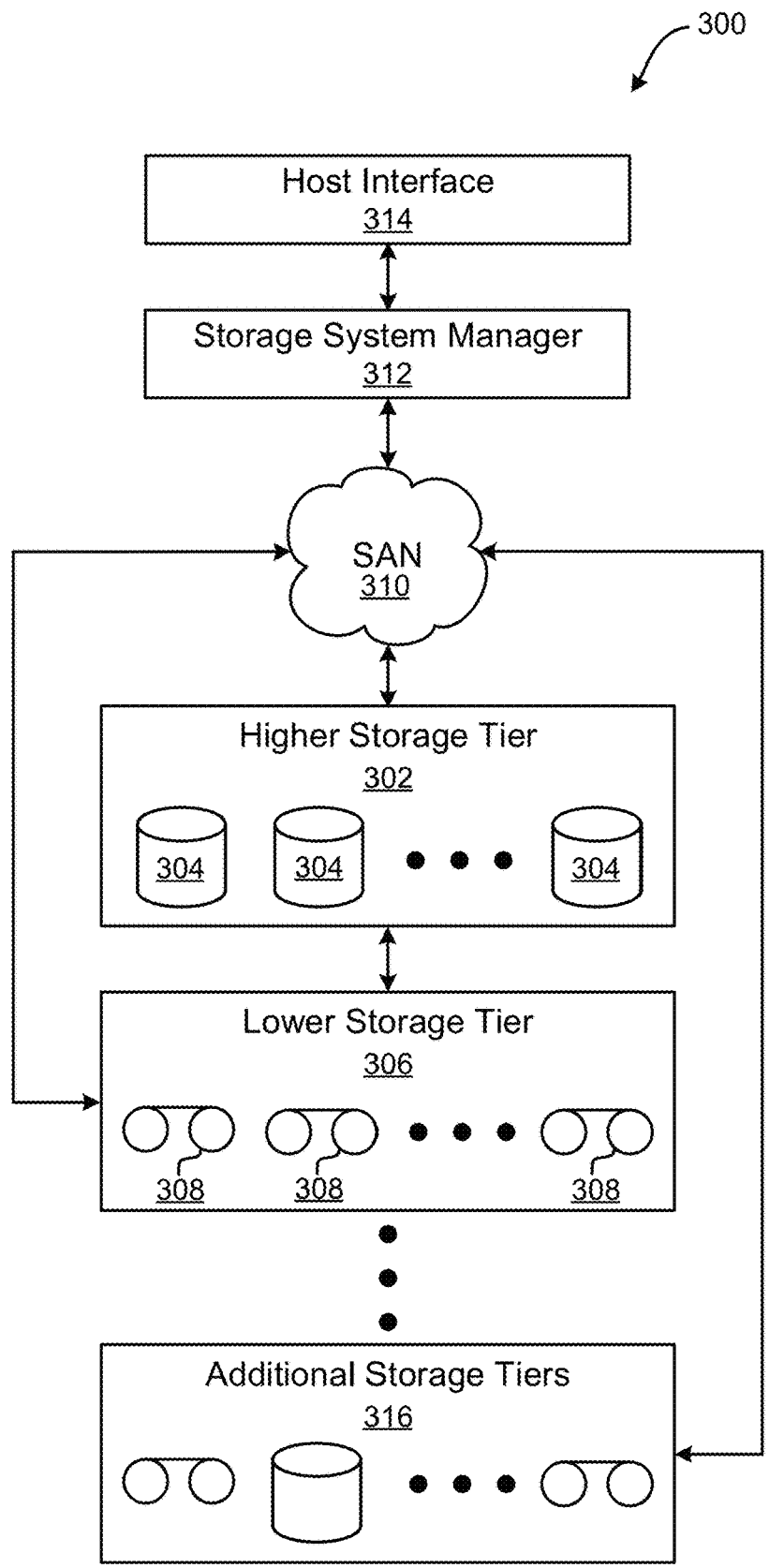
FIG. 3 is a diagram of a tiered data storage system, in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

As mentioned elsewhere herein, file systems may exist and be shared at more than one physical location where the file system is mounted on multiple servers. One specific type of such a shared file system includes a clustered file system. Clustered filesystems provide several features that facilitate the implementation of highly-available storage environments capable of withstanding catastrophic hardware failures. For example, data of a filesystem may be replicated in three exact copies that each are stored at different locations, e.g., same data contents and same metadata. By maintaining a replica of the data at different locations, e.g., disks, racks, geographically-separate locations, etc., processing of the system may be sustained using the secondary, tertiary replicas of the data in the event of a total failure in the primary replica. In some conventional techniques, different replicas of the same data are maintained by, e.g., synchronous mirroring utilizing filesystem-based replication, synchronous mirroring utilizing storage and/or underlying SAN based replication, asynchronous mirroring utilizing filesystem-based replication, asynchronous mirroring utilizing storage and/or underlying SAN based replication, point in time copy using storage and/or underlying SAN based functionality, etc.

Technology often caters to hyper-connected, on-demand and digital requirements of the world. Consumers expect immediate satisfaction and access to services that the consumers call for. The ability to deliver on these services in real-time calls for a continually increasing amount of speed, relevancy and timeliness, in order to cut through noise of options and to gain the loyalty of consumers. A business survey conducted by VOLTDB: "The Psychology of Waiting Survey Report—The Business Impact of Diminishing Consumer Patience," identified several prominent psychology changes of users in recent times: consumer expectations and patience for certain actions are dependent on accurate and consistent real-time analysis; a psychological need for immediacy across generations and industries such as gaming, financial services, AdTech and telecommunications; and emotional reactions of consumers vary drastically when tasks take longer than anticipated by the user.

To cater to such psychological changes, a time between product releases of traditional telecom vendors has decreased. Moreover, the traditional telecom vendors have assumed a relatively greater degree of responsibility of ensuring transparent and timely responses and/or services to multiple associated entities, e.g., state entities, officials, partners, individuals, legal entities, organizations, justice departments, a compliance and/or audit department of technical standards, interconnection with regional and international telecommunication networks, customer query, national security, environmental organizations, etc.

In order to better meet expectations of customers and other entities, in a typical environment, a telecom vendor may use multiple applications which store and process data that is stored on a general-purpose clustered filesystem, e.g., which may be built using a shared-nothing architecture or a shared architecture built using block storage. For application consistency, the application may be configured independently to keep multiple copies of same data, e.g., with same filenames in different directories or with different filenames in same directory, on a filesystem layer, in addition to replicating the data at a block or filesystem layer, e.g., a three-copy architecture, for business continuity purposes. However, an applicability of this blueprint is limited. This is because as the volume of data that exists in storage have increased, revenues have declined with competition interferences and increases in velocity expectations from associated entities. Telecom vendors as a result are forced to search for improved architectures and integrations that are capable of helping vendors in reducing their capital expenditure and operational expenditure, as well as matching and/or exceeding consumer expectations.

Various embodiments and approaches described herein may be utilized to achieve relatively shorter application response times than are conventionally available in the conventional filesystem replication techniques described elsewhere above, e.g., saving exactly the same copy of data multiple times in different locations. This reduction in application response time is enabled in various embodiments and approaches described herein by saving varied copies of the same data and creating an association, e.g., hint, with applications. The created association is thereafter considered when performing application time sensitive read operations to ensure that data that fulfills the read operations is read from a location in a time efficient and/or a cost efficient manner.

Figure 4:
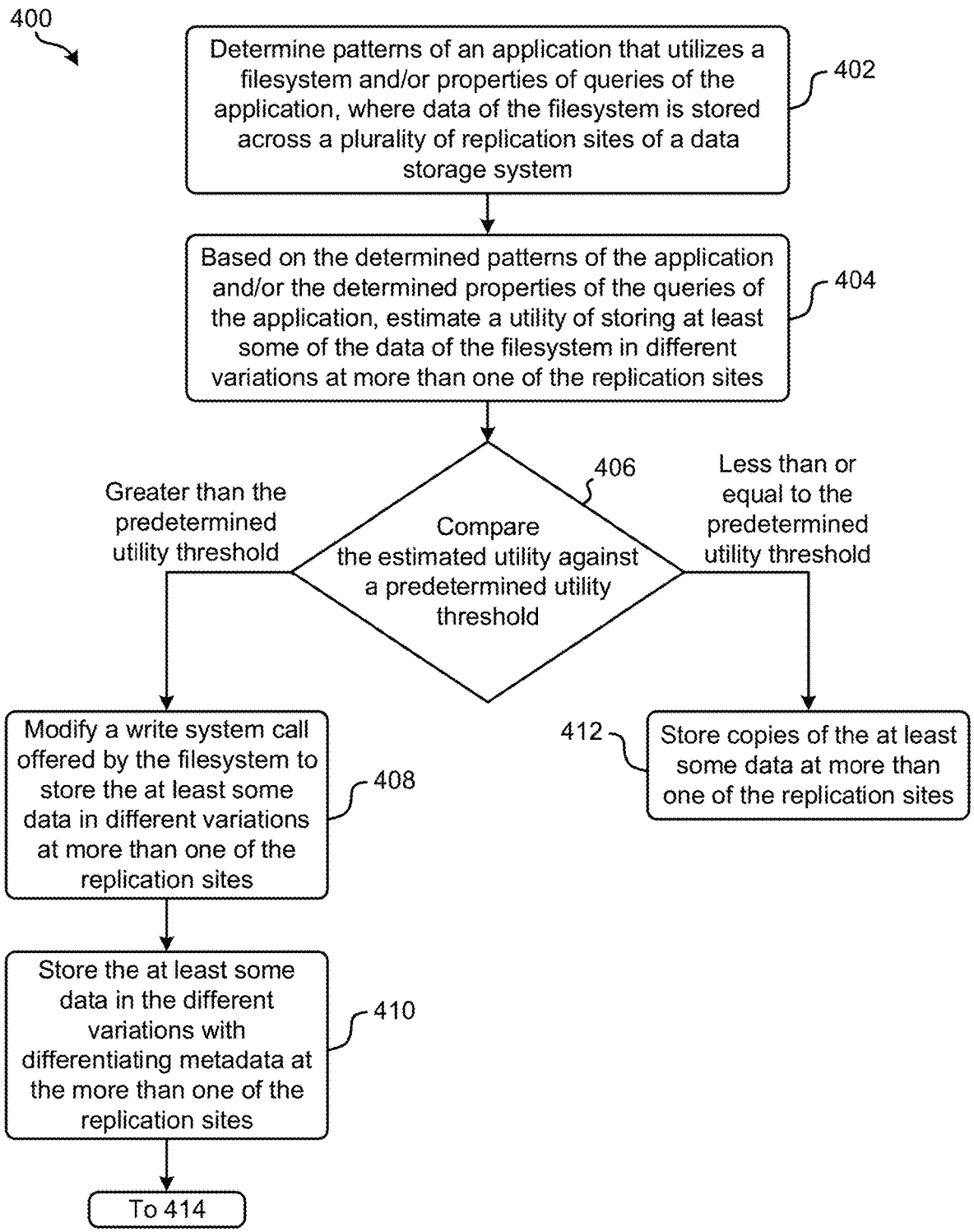
FIG. 4 is a flowchart of a method, in accordance with one embodiment.
Figure 4:
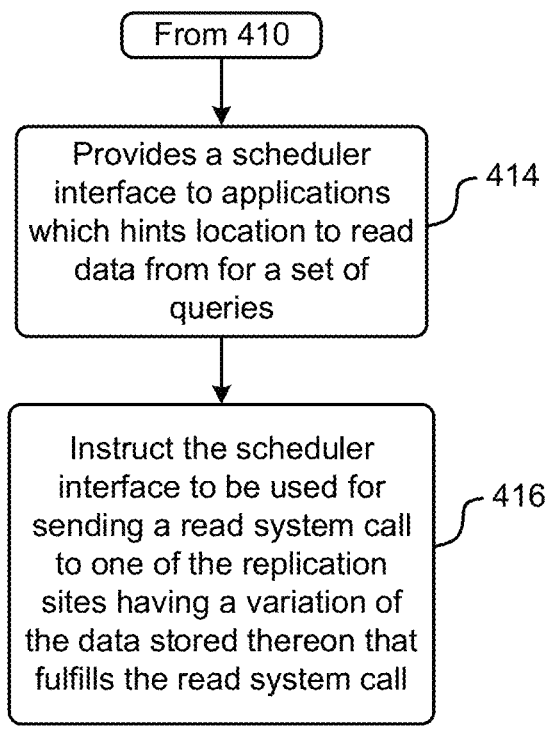

Now referring to FIG. 4, a flowchart of a method 400 is shown according to one embodiment. The method 400 may be performed in accordance with the present invention in any of the environments depicted in FIGS. 1-3 and 5-7, among others, in various embodiments. Of course, more or fewer operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

Operation 402 includes determining patterns of an application that utilizes a filesystem and/or properties of queries of the application. For context, data of the filesystem, e.g., content of a data file, may be stored across a plurality of replication sites of a data storage system. For example, the data of the filesystem may be stored, e.g., on more than one physical disk, on more than one magnetic recording tape, across more than one physical location, in more than one server rack, in a clustered file system, etc. In some approaches, the data of the filesystem may be stored across the plurality of replication sites of the data storage system to prevent data loss in the event of a total failure in a primary replica of data.

In some approaches, the patterns of the application may be determined using known techniques for using a framework to monitor and analyze application behavior, e.g., such as read patterns of the application, types of queries of the application, etc. Patterns of the application that may be determined in one approach include characteristics and/or needs of the application, e.g., whether data is stored as files in a database (db), whether data is stored as files, whether data is stored as blobs, whether data is stored as an object, hints such as in some advanced applications that provide hints to filesystem which are primarily used to fetch the data blocks ahead of time, etc. A non-limiting list of various patters in another approach includes, e.g., mmap (in memory applications), sequential read (multimedia files), sequential write (multimedia files or stream data), random read (search applications), random write (object or small files), etc. These patterns may be identified primarily based on how they fetch data and metadata blocks from disk. According to some other approaches, the patterns of the application may additionally and/or alternatively include, e.g., synchronize access potential across the plurality of replication sites, thresholds of the application, processing resources available to the application, etc. In yet another approach, patterns of the application that may be determined include an input/output (I/O) nature of the application, e.g., whether data is written once and read many times (worm architecture), whether the data is read only, etc. Known types of read patterns may additionally and/or alternatively be included in the patterns of the application that may be determined.

In some approaches, method 400 includes optionally estimating times that it takes for the application to access data from the different replication sites. Replication properties of the filesystem may additionally and/or alternatively be determined. Estimated times and/or the replication properties may be determined via observations made during testing of the filesystem and/or during normal operation of the filesystem. In some other approaches, known estimation techniques and/or known techniques of comparative analysis may be employed to determine the estimate times and/or the replication properties. These times and/or properties may be determined to determine additional information about the application and/or the queries of the application.

Various approaches for determining types of queries of the application will now be disclosed below. For context, queries are typically requests for information. In various embodiments and approaches described herein the queries are requests for data of the filesystem, which may originate from an analytic application that is configured to generate one or more types of queries for one or more information fields. It should be noted that in some approaches, the application or administrator that initiates a passing of the query may also define the metadata such that the scheduler interfaces understand the metadata and route the queries to a specific server for processing. If such metadata is available, the metadata may be adhered to.

In one preferred approach, determining the properties of the queries of the application includes determining a minimum amount of the data that an answer to at least one of the queries includes. Determining the properties of the queries of the application may additionally and/or alternatively include determining a typical time, e.g., average, that is consumed in responding to the queries that the application uses. In one approach, the average time may consider the respective response times of more than one of the replication sites responding to the queries based on the responding replication sites having data that fulfills the queries stored thereon. In some approaches, a property of a query of the application may define a type of the query. Various further examples of query properties that may be determined include, e.g., available parameter properties, query language properties, usage properties, regular aggregate properties, formatting properties, query item properties, filenames, description, last changed properties, last changed by properties, model comments, expression properties, external name properties, hidden properties, usage properties, format properties, data type properties, precision properties, scale properties, size properties, is nullable properties, etc.

In some approaches, the properties of the queries of the application may be determined using known techniques for determining one or more properties of queries. In some other approaches, the properties of the queries of the application may additionally and/or alternatively be determined via observations during testing of the applications and/or via observation during normal operation in which queries are fulfilled.

The patterns and/or properties of the determinations of operation 402 may in some approaches include estimations of whether the data that provides a response to a first set of queries could also provide a response to a second set of queries. A determination that a response to a first set of queries could also provide a response to a second set of queries may indicate that there is relatively more utility, e.g., with respect to application response times, for storing data in exact copies across replication sites than otherwise storing the data in different variations across the replication sites.

With information about the application and/or the queries determined, it may be determined whether storing different variations of data across the replication sites would result in relatively more efficient response times of the application than otherwise storing data without variations, e.g., exact copies, across the replication sites. In some approaches, in order to determine such a relative efficiency, a utility of storing at least some of, or all of, the data of the filesystem in different variations at more than one of the replication sites may be estimated, e.g., see operation 404 of method 400. The estimation is in some approaches based on the determined patterns of the application and/or the determined properties of the queries of the application. Various techniques for estimating the utility of storing at least some of, or all of, the data of the filesystem in different variations at more than one of the replication sites are described below. In some other approaches, the administrator of the data storage system may set the different types of variations of the data that are to be considered for estimating the utility.

Estimating the utility of storing at least some of the data of the filesystem in different variations at more than one of the replication sites in one approach includes determining whether the data fulfills a first set of the queries while the data is in a first variation stored on a first of the replication sites and also fulfills a second set of the queries while the data is in a second variation stored on a second of the replication sites, e.g., concurrently stored in different variations on more than one of the replication sites. Data that is determined to fulfill the first set of the queries while the data is in the first variation stored on the first of the replication sites and also fulfill the second set of the queries while the data is in the second variation stored on the second of the replication sites may be assigned a relatively greater utility than data that is determined to not fulfill the first set of the queries and/or the second set of queries while the data is in the first variation stored on the first of the replication sites and in the second variation stored on the second of the replication sites. This is because storing the data in different variations at different replication sites does not result in relatively improved application response times, e.g., relative to simply storing the data as exact copies at a plurality of the replication sites. In one approach, the utility of storing at least some of the data of the filesystem in different variations at more than one of the replication sites may be estimated as the difference in the application response time that results from storing the data in different variations at more than one of the replication sites and the application response time that results from storing the data in the as copies at more than one of the replication sites. As will be described elsewhere below, the difference in these response times may in some approaches be compared with a predetermined threshold in order to determine whether to modify a write system call offered by the filesystem to store the data in different variations at more than one of the replication sites, e.g., see decision 406 of method 400.

In some other approaches, the estimated utility may be based on time complexities associated with reading and/or writing the at least some of the data of the filesystem in different variations at more than one of the replication sites and/or storage complexities associated with storing the at least some of the data of the filesystem in different variations at more than one of the replication sites. Techniques for estimating the utility based on such time and storage complexities are described below in several approaches.

In some approaches, the utility estimation may be based on trial and analysis. For example, at least some of the data of the filesystem may be stored in more than one variation and each of the variations may be stored on a different one of the replication sites of the data storage system. Note that in contrast to the different variations being stored on the different replication sites of the data storage system, in some approaches the different variations may be stored, e.g., in a test system, in logical storage, etc. Subsequent to the variations being stored on the different replication sites, one or more predetermined access and/or read operations may be executed to determine the different time complexities, e.g., response times, associated with the application accessing and/or reading such data. Note that in some other approaches, the different response times may be determined using known techniques for estimating application response times, rather than storing the data across the different replication sites for testing purposes. The determined different response times may be compared with predetermined and/or estimated response times for the application to access and/or read the at least some of the data of the filesystem when stored without variations across more than one of the replication sites, e.g., such as the same replication sites that the different variations of data are stored on. In some approaches, it may be determined that there is no utility in storing the at least some of the data of the filesystem in variations across more than one of the replication sites in response to a determination that the application has relatively more efficient response times in accessing and/or reading the data stored without variations than the response times of the application in accessing and/or reading the data stored with variations. In contrast, it may be determined that there is at least some utility in storing the at least some of the data of the filesystem in variations across more than one of the replication sites in response to a determination that the application has relatively less efficient response times in accessing and/or reading the data stored without variations than the response times of the application in accessing and/or reading the data stored with variations. In some approaches, the difference in the response times may establish the estimated utility, which may be further considered in view of thresholds. Moreover, in some approaches, a time for writing the data in the different variations at the different replication sites may additionally and/or alternatively be considered, e.g., added to the difference in the response times, to incorporate storage complexities associated with storing at least some of the data of the filesystem in different variations at more than one of the replication sites, in the estimated utility. As will be described elsewhere below, differences in these determined times may in some approaches be compared with a predetermined threshold in order to determine whether to modify a write system call offered by the filesystem to store the data in different variations at more than one of the replication sites, e.g., see decision 406 of method 400.

The estimation of the utility of storing at least some of the data of the filesystem in different variations at more than one of the replication sites may additionally and/or alternatively be based on a predetermined table. For example, in some approaches, method 400 may include accessing and/or reading a predetermined table to determine whether storing different variations of data across the replication sites would result in relatively more efficient response times of the application than otherwise storing data without variations across the replication sites. The predetermined table may include characteristics and/or patterns that are each pre-correlated to different types of data variations. In one approach, a type of data variation that is pre-correlated with the patterns of the application and/or the properties of the queries may be identified in the table, and at least some of the data of the filesystem may be modified according to the type of data variation identified in the table. Trial and analysis techniques similar to those described elsewhere herein may be performed using the modified data to determine whether the application has relatively less efficient response times or relatively more efficient response times in accessing and/or reading the data stored without variations than the response times of the application in accessing and/or reading the data stored with variations.

The estimation of the utility of storing at least some of the data of the filesystem in different variations at more than one of the replication sites may additionally and/or alternatively be based on a predetermined scoring standard. For example, in some approaches, a plurality of patterns of an application and/or properties of queries may be pre-assigned with different scores. In such a scoring assignment, patterns of an application and/or properties of queries that are predetermined to be associated with relatively shorter application response times when data is stored in a filesystem in which the patterns and/or properties are present may be assigned relatively greater scores than patterns of an application and/or properties of queries that are predetermined to be associated with relatively longer application response times when data is stored in the filesystem in which the patterns are present. Note that in some approaches, the response times of data may consider and incorporate analytic processing time, e.g., such as sorting the data at a respective one of the replication sites to fulfill a data query. Moreover, in some approaches, an estimated time for performing disaster recovery operations, e.g., such as a recovery time for modifying a variation of the data to an unsorted copy of the data using differentiating metadata, may additionally and/or alternatively be considered and incorporated into the response times. In another approach, the patterns of an application and/or properties of queries that are determined, e.g., from the trial and analysis techniques described elsewhere above, to be associated with relatively shorter application response times when data is stored in a filesystem in which the patterns and/or properties are present may be assigned relatively greater scores than patterns of an application and/or properties of queries that are predetermined to be associated with relatively longer application response times when data is stored in the filesystem in which the patterns are present. Estimation of the utility of storing at least some of the data of the filesystem in different variations at more than one of the replication sites may include totaling the scores of the determined patterns of the application that utilizes the filesystem and/or the determined properties of the queries of the application. In some approaches, the totaled sum may be the estimated utility which may be compared with a predetermined threshold in order to determine whether to modify a write system call offered by the filesystem to store the data in different variations at more than one of the replication sites, e.g., see decision 406 of method 400.

Storage availability may additionally and/or alternatively be considered in some approaches to estimate the utility of storing at least some of the data of the filesystem in different variations at more than one of the replication sites. For example, it should be noted that despite storing the data in variations at different replication sites potentially resulting in relatively more efficient application response times than otherwise storing the data without variations on the replication sites, in some approaches it may be determined whether an amount of storage consumed in storing the data in such variations offsets the application response time utility that results from storing the data in variations on the different replication sites. This is because some variations of data may consume relatively more storage space and/or involve relatively more computation power than other variations of data. In some approaches, in order to incorporate storage complexities into the estimated utility of storing at least some of the data of the filesystem in different variations at more than one of the replication sites, method 400 may optionally include determining a difference between an amount of storage capacity of the replication sites that is consumed in storing the data in copies across the replication sites and an amount of storage capacity of the replication sites that is consumed in storing the data in variations at the different replication sites, e.g., using known techniques for estimating and comparing storage consumption that results from data writes. As will be described elsewhere below, this determined difference in storage capacity may be compared with a predetermined threshold in order to determine whether to modify a write system call offered by the filesystem to store the data in different variations at more than one of the replication sites, e.g., see decision 406 of method 400.

In some approaches, historical analytics of the application, such as a type/nature of queries that are typically processed by the application, and/or feedback from an administrator or a predetermined machine learning based algorithm of the application may additionally and/or alternatively be incorporated into estimations of the utility of storing at least some of the data of the filesystem in different variations at more than one of the replication sites. For example, in some approaches, consideration of the historical analytics of the application and/or feedback from an administrator of the application may include determining whether a predetermined percentage of the queries of the application within a predetermined amount of time are based on the same or a similar format, e.g., request the same type of information. In some approaches, in response to a determination that a predetermined percentage of the queries of the application within a predetermined amount of time are based on the same or a similar format, the estimated utility may be determined to be relatively less than the estimated utility of a determination that a predetermined percentage of the queries of the application within a predetermined amount of time are not based on the same or a similar format. This is because different queries may, in some approaches, be relatively more quickly fulfilled as a result of the application having access different variations of data.

Several non-limiting examples of different variations in which the data of the filesystem may be stored at more than one of the replication sites will now be described below. It should be noted that, in some approaches, a utility may be estimated for each of a plurality of the different variations in which the data of the file system may be stored, in order to determine, e.g., based on results of comparing the estimated utility with a predetermined utility threshold, which of the variations are likely to result in the quickest application response times as a result of being implemented. Accordingly, depending on the approach, method 400 may include estimating the utility of one or more of the different variations in which the data of the filesystem may be stored.

In some approaches in which the data is stored as files in a db, the data may be stored as copies with varying keys, e.g., primary key, secondary key, natural key, surrogate key, composite key, alternate key, unique key, foreign key, etc. Where the data is stored as files in a db, the data may additionally and/or alternatively be stored as copies with varying schema and in case of files, stored with different headers and footers. In another approach, where the data is stored as files in a db, the data may additionally and/or alternatively be stored as copies with varying database formats/types, and in approaches that include files, the data may be stored with different parseable formats, e.g., such as Extensible Earkup Language (XML), JavaScript Object Notation (JSON), Comma Separated Values (CSV), etc. In other approaches, where the data is stored as files in a db, the data may additionally and/or alternatively be stored as copies with varying triggers for offloading the computation and/or stored as copies with a varying or merging data subset. Further examples of different variations in which the data of the filesystem may be stored at more than one of the replication sites includes, e.g., storing formats of varying copies suited for programming environment, which may be dependent on a response; storing formats of varying copies with different vector dimensions; storing formats of varying copies that assist subsequent queries from the same application or a different application, storing formats of varying copies that are predetermined to help maintain locking/consistency in case of multiple queries; storing formats of varying copies that are predetermined to help with reliability, availability, and serviceability (RAS) serving in case in which an incorrect response is received; storing formats of varying copies that store data in sequential blocks versus random blocks; etc.

The estimated utility is compared against a predetermined utility threshold in decision 406. As mentioned elsewhere herein, in some approaches, a utility may be estimated for each of a plurality of different variations in which the data of the file system may be stored. In some approaches in which the predetermined utility threshold is based on the same utility metric, e.g., access time, read time, write time, storage consumption, etc., as more than one of the estimated utilities, the same predetermined utility threshold may be compared with a more than one of the estimated utilities. For example, an estimated utility that is based on a time complexity of accessing and reading data from one of the replication sites may be compared against a predetermined utility threshold that is a maximum amount of time that a customer is willing to wait for a query to be fulfilled.

The predetermined utility threshold may be set and/or adjusted by, e.g., an administrator of the application, a service, etc. In some approaches, the predetermined utility threshold may be dynamically adjusted, e.g., according to processing consumption, according to storage consumption, according to determined changes of the properties of the queries, according to determined changes of the patterns of the application, etc. For example, in response to a determination that processing consumption and/or storage consumption of the data storage system exceeds a predetermined threshold subsequent to modifying the write system call offered by the filesystem to store the data in different variations at more than one of the replication sites, the predetermined utility threshold may be decreased and/or the write system call offered by the filesystem may be modified to store at least some of the data as exact copies at more than one of the replication sites.

In response to a determination that the estimated utility is less than or equal to the predetermined utility threshold (e.g., as illustrated by the "Less than or equal to the predetermined threshold" logical path of decision 406), in some approaches, copies of the at least some of the data, e.g., exact copies of the data, may be stored at more than one of the replication sites, e.g., see operation 412. In some approaches, a current write system call offered by the filesystem may be modified to store the data as copies at more than one of the replication sites and/or copies of filesystem calls, e.g., read, write, copy, etc., may be created to adhere the variations of the data determined to enable efficient application response times to be stored across the different replication sites. This modification may be performed on a filesystem layer of the data storage system. In contrast, in some other approaches, the current write system call offered by the filesystem may be not modified, provided that a current write system call is configured to store the data as exact copies at more than one of the replication sites. Depending on the approach, the data may be stored as copies at any number of the replication sites, e.g., two, three, four, a majority plurality of the plurality of the replication sites, a minority plurality of the plurality of the replication sites, etc.

In contrast, in response to a determination that the estimated utility is greater than the predetermined utility threshold (e.g., as illustrated by the "Greater than the predetermined threshold" logical path of decision 406), one or more operations may be performed to focus on such a utility at the filesystem layer. For example, in some approaches, the write system call offered by the filesystem may be modified to store the data in different variations at more than one of the replication sites, e.g., see operation 408. Note that in some approaches, the write system call may be modified to store a unique variation of the data at each of the different replication sites. In contrast, in some other approaches, the write system call may be modified to store a unique variation of the data at some of the different replication sites, and exact copies the variations at more at least two of the replication sites.

In some other approaches, the predetermined utility threshold may be a condition that when determined to be true, equates to the estimated utility exceeding the predetermined utility threshold. For example, in some approaches in which estimating the utility of storing at least some of the data of the filesystem in different variations at more than one of the replication sites includes determining whether the data fulfills a first set of the queries while the data is in a first variation stored on a first of the replication sites and fulfills a second set of the queries while the data is in a second variation stored on a second of the replication sites, the condition may test whether the data fulfills the first set of the queries while the data is in the first variation and fulfills the second set of the queries while the data is in the second variation. In one or more of such approaches, the estimated utility may be determined to be greater than the predetermined utility threshold in response to a determination that the data fulfills the first set of the queries while the data is in the first variation and fulfills the second set of the queries while the data is in the second variation. In contrast, the estimated utility may be determined to be less than or equal to the predetermined utility threshold in response to a determination that the data does not fulfill the first set of the queries while the data is in the first variation and/or does not fulfill the second set of the queries while the data is in the second variation.

It should be noted that in some other approaches, the comparison of the estimated utility and the predetermined utility threshold may be optional. For example, in one or more of such approaches, method 400 may additionally and/or alternatively include selecting a predetermined number of the variations that have a greatest estimated utility, e.g., greatest estimated utility with respect to a predetermined one or more of the utility metrics such as storage complexity, time complexity, etc., for storing across the replication sites.

Operation 410 of method 400 includes storing the at least some of the data of the filesystem in the different variations at the more than one of the replication sites. More specifically, in one approach, method 400 may include instructing the modified system call to be executed to thereby cause the data to be written in the different variations at the more than one of the replication sites. At least some of, and preferably each of, the different variations of the data may be stored with differentiating metadata to be used for reconstructing the variation of the data stored at another one of the replication sites in case of disaster recovery. In one approach, the differentiating metadata may specify one or more attributes of the difference(s) between two variations of the data. For example, a first variation of the data stored at a first of the replication sites may include differentiating metadata that identifies differences between the first variation of the data and a second variation of the data stored on a second of the replication sites. This way, in the event that the first variation of the data is compromised and/or lost during a disaster event on the first replication site, the first variation of the data may be recovered using the second variation of the data and the differentiating metadata stored with the second variation of the data. In another approach, the differentiating metadata may additionally and/or alternatively identify a location of at least one of the replication sites having an original copy of the data, e.g., a copy of the data that is not stored with variation, an unsorted copy of the data, etc., stored thereon, that may be used to recover data that is lost and/or compromised during a disaster event of a replication site. The original copy of the data may in some approaches be stored on at least two of the replication sites to reduce the probability of the original copy of the data being lost as a result of the single original copy being stored on only a single replication site that experiences a failure event.

A scheduler interface may be provided, e.g., differentiating metadata may be output, to the application, e.g., see operation 414. The scheduler interface is in one preferred approach configured to hint a location, e.g., one of the replication sites, to read data for a set of the queries of the application, e.g., {{'copy-1': 'query-set-1', 'copy-2': 'query-set-3', 'copy-3': 'query-set-2'}}. In some approaches, the hint for a given one of the queries may be generated based on the information that was used to determine that a given variation of the data is associated with efficient application response times, e.g., such as the previously determined properties of the queries and/or the previously determined patterns of the application. For example, in the hints above, the scheduler may hint copy-1 of the data as a location for reading data for the query-set-1 in response to a determination that query-set-1 requests information associated with a predetermined name and a determination that copy-1 of the data is a data variation with records sorted according to name. Moreover, in the hints above, the scheduler may hint copy-2 of the data as a location for reading data for the query-set-2 in response to a determination that query-set-2 requests information associated with a predetermined ID number and a determination that copy-2 of the data is a data variation with records sorted according to ID number. Furthermore, in the hints above, the scheduler may hint copy-3 of the data as a location for reading data for the query-set-3 in response to a determination that query-set-3 requests information associated with a predetermined vector dimension and a determination that copy-3 of the data is a data variation with records sorted according to vector dimension.

Operation 416 includes instructing the scheduler interface to be used, e.g., by the application or the filesystem itself, for sending a read system call to one of the replication sites having a variation of the data stored thereon that fulfills the read system call. Accordingly, in response to receiving the instruction to use the scheduler interface, the application may use the scheduler interface and moreover send one or more read system calls to respective locations for appropriately tailored data, e.g., a copy of the data with a variation that most efficiently fulfills the query of an application. In an alternate approach, an instruction may be output to the application that includes a designation of which of the variations a query should be routed to.

Various benefits are enabled as a result of implementing the techniques of various embodiments and approaches described herein. For example, as a result of implementing the techniques of various embodiments and approaches described herein, data storage systems include a relatively deeper integration of storage replicated copies with applications which are time sensitive. More specifically, such embodiments and approaches propose a framework that enables reductions in application response time by saving varied copies of the same data, as opposed to merely saving exact copies of data in different locations, in response to a determination that an estimated utility of storing the data in variations at different replication sites is greater than the predetermined utility threshold. It should be noted that conventional data storage systems do not consider the utility of storing the data in variations at different replication sites, but instead merely store data in the exact copies of data in different locations. Moreover, in conventional data storage systems, a majority of the time more than one of these exact copies of data do not contribute to application response efficiency as they remain unused other than for instances of disaster event recovery. In sharp contrast, as a result of incorporating various techniques described herein, variations of data that decrease application response times are identified based on the estimated utilities and write system call are thereafter modified to store the data in different variations at more than one of the replication sites. This results in improvements to computational performance of data storage systems, as the different variations of data are used to reduce application response times during normal operation of the data storage system as well as during disaster recovery events. Moreover, it should be noted that the degree to which such techniques improve performance will continue to increase as the amount of data that data storage systems are expected to store also increases over time.

Disaster recovery features are also enabled in various embodiments and approaches described herein, as at least some of, and preferably each of, the different variations of the data that are stored across the different replication sites may be stored with differentiating metadata to be used for reconstructing the variation of the data stored at another one of the replication sites for disaster recovery. These disaster recovery features include an association/hint with applications, such that the application is able to read from the copy/location which more efficiently addresses a particular application demand and/or requirement of the application, in a relatively shorter duration of time and/or at a relatively lesser cost, e.g., financial cost, processing resource cost, application resources cost, etc., than the efficiency of otherwise reading data from another copy/location. The various embodiments and approaches described herein that enable these benefits may act as a distinguishing factor and value addition for clustered filesystems, e.g., particularly for integration of enterprise applications with a filesystem. Note that these benefits may also be realized in cloud storage as clustered filesystem become integrated within cloud based storage systems. Improved response times are also enabled within end applications as a result of implementing various storage techniques described elsewhere herein for varied replication.

Figure 5:
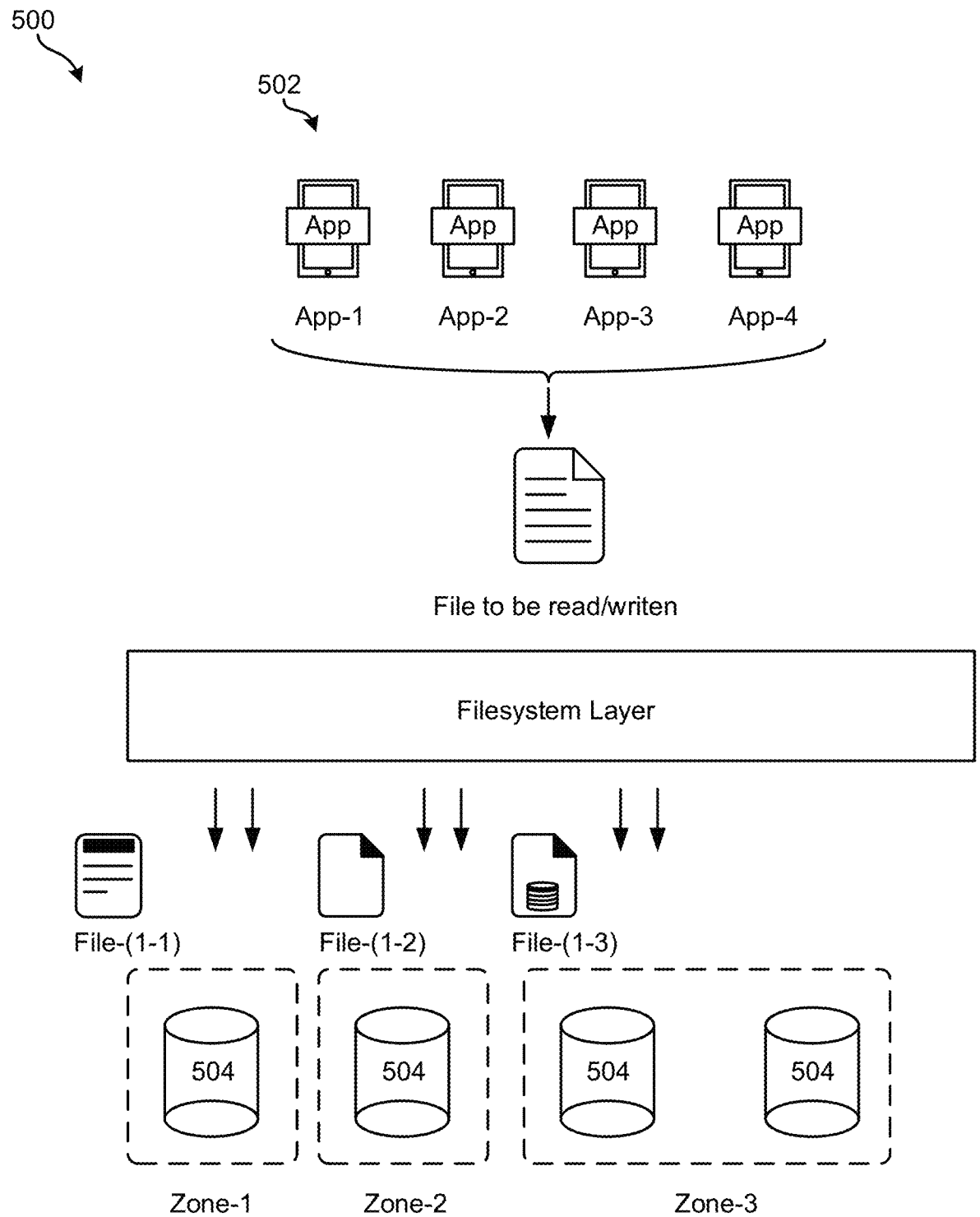
FIG. 5 is a representation of a data storage system, in accordance with one embodiment.

FIG. 5 depicts a data storage system 500, in accordance with one embodiment. As an option, the present data storage system 500 may be implemented in conjunction with features from any other embodiment listed herein, such as those described with reference to the other FIGS. Of course, however, such data storage system 500 and others presented herein may be used in various applications and/or in permutations which may or may not be specifically described in the illustrative embodiments listed herein. Further, the data storage system 500 presented herein may be used in any desired environment.

Data storage system 500 includes an application layer 502, having a plurality of applications, e.g., App-1, App-2, App-3 and App-4, that utilize a filesystem, e.g., such as a filesystem of a filesystem layer of the data storage system, e.g., see Filesystem layer. Queries of the applications request data, e.g., see File to be read/written, from the filesystem layer of the data storage system 500. The data storage system 500 furthermore includes a plurality of replication sites, e.g., see Zone-1, Zone-2 and Zone-3, which may be geographically dispersed, and each include one or more storage media 504. For example, Zone-1, Zone-2 and Zone-3 may be geographically dispersed where Zone-1 is an on-premise replication site that is located in a first city, Zone-2 is a public cloud-based replication site that is located in a second city, and Zone-3 is another public cloud-based replication site that is located in a third city.

Patterns of one or more of one or more of the applications that utilize the filesystem and/or properties of queries of the applications may be determined. Based on the determined patterns of the application and/or the determined properties of the queries of the application, a utility of storing at least some of the data, or all of the data, of the filesystem in different variations, e.g. see File-(1-1), File-(1-2) and File-(1-3), at more than one of the replication sites may be estimated. The estimated utility may be compared against a predetermined utility threshold, and in some approaches, in response to a determination that the estimated utility is greater than the predetermined utility threshold, a write system call offered by the filesystem may be modified to store the data in different variations at more than one of the replication sites.

FIG. 6A depicts a representation 600 of records of data of a data storage system, and FIG. 6B depicts a representation 650 of copies of the records of FIG. 6A, in accordance with several embodiments. As an option, the present representations 600, 650 may be implemented in conjunction with features from any other embodiment listed herein, such as those described with reference to the other FIGS. Of course, however, such representations 600, 650 and others presented herein may be used in various applications and/or in permutations which may or may not be specifically described in the illustrative embodiments listed herein. Further, the representations 600, 650 presented herein may be used in any desired environment.

It may be prefaced that in some approaches, a filesystem "fopen" call for a write may take following the additional illustrative parameters:

fopen("file.data","w",encoder:encoderFunction( ), decoder:decoderFunction( ),sorting:sortingFunction( ),indexList)   Function (1)

In the above Function (1), the encoder "encoderFunction( )" is a function pointer that may be used to encode, e.g., marshal, the data into a stream. Moreover, the decoder "decoderFunction( )" is a function pointer to encode, e.g., unmarshal, a stream into a memory structure of data. The sorting function "sortingFunction( )," is a function that may be used to take and sort a record list. Furthermore, "indexList:" may be a list of indexes with which file copies need to be organized. The "encoder/decoder" module is an application independent function which may be stored with the file as metadata, and may be used by filesystem to interpret and sort the records with ASN.1, e.g., abstract syntax notation 1, or alike syntax.

In response to a modified fopen call being issued by an application to the filesystem, an application may register the encoder and decoder to interpret the records and provide the list of attributes on which the index must be prepared. This encoder and decoder may also provide predetermined "compare" logic which may be used by the filesystem to sort the record and keep it as a replica.

Referring now to representation 600 of FIG. 6A, it may be assumed that records of the representation 600 are provided by applications to be stored in the filesystem. Each of the records of the representation may be identified by a record name, e.g., see Amrut, Shloka and Ved, and a record ID, e.g., see 14, 13 and 15 (respectively).

In some approaches, the records of the representation 600 may be stored as a flat file, and the flat file may be replicated by filesystem, e.g., a plurality of copies of the flat file replicated across a plurality of replication sites of a data storage system. Assuming that the application is relatively read operation sensitive, these records may even be stored with sorting performed on one or more attributes of the records, in sequential form. For example, assuming that the records of representation 600 are indexed on the two attributes "Name" and "ID," the records may be stored, e.g., by the application, into two different files. For example, a first of such files may be sorted by record "Name," e.g., see Copy-1 of representation 650, and a second of the files may be sorted by record "ID," e.g., see Copy-2 of representation 650. Similar to as described in various embodiments and approaches described elsewhere herein, e.g., see method 400, such sorting and storing of data in different variations may be based on an estimated utility of storing the data in different variations at different replication sites of a data storage system. For example, in one approach, the records of representation 600 may be stored as a variation that results from being sorted by record name, e.g., Copy-1, in response to a determination that the estimated utility of storing the data in such a variation is greater than a predetermined utility threshold. The data of representation 600 may additionally and/or alternatively be stored as a variation that results from being sorted by record ID, e.g., Copy-2, in response to a determination that the estimated utility of storing the data in such a variation is greater than a predetermined utility threshold. As a result of storing the data in such variations, queries that request information about names of the records are routed to Copy-1 and similarly queries that request information about IDs of the records are routed to Copy-2. This routing of the queries ensures that the queries are fulfilled in both a time and processing resource efficient manner as each of the different variations of the data are, in the current example, pre-sorted with respect to information that the query is requesting.

The variations of the data may in some approaches be stored with metadata, e.g., metadata changes, that may be used to build other copies of the data such as a variation of the data that is lost in a disaster event. Similar to as mentioned elsewhere herein, in some approaches, an association/hint may be made available to the application such that the application is enabled to read from a copy of the data and/or a location that that most efficiently addresses a particular demand/requirement of the application in a relatively shortest amount of time and/or a relatively smallest cost.

In some approaches the filesystem may be agnostic towards duplication of the same records, and as a result the filesystem may re-apply a filesystem replication factor to create copies of the record. For example, assuming that the replication factor of the filesystem is two, the filesystem may apply the replication factor and make two copies of the records, and therefore four times the space on disk will be consumed. In contrast, if the filesystem instead manages the record sorting and replication at the filesystem level, then only two copies of the records may be present. For reading, in some approaches, the fopen call may be modified as:

fopen("file.data", "r", indexName)   Function (2)

In Function (2), the "indexName" is the name of the index from where the records need to be read. Here, depending on which index is provided to the application, the proposed framework determines which of the copy is read from.

Figure 7:
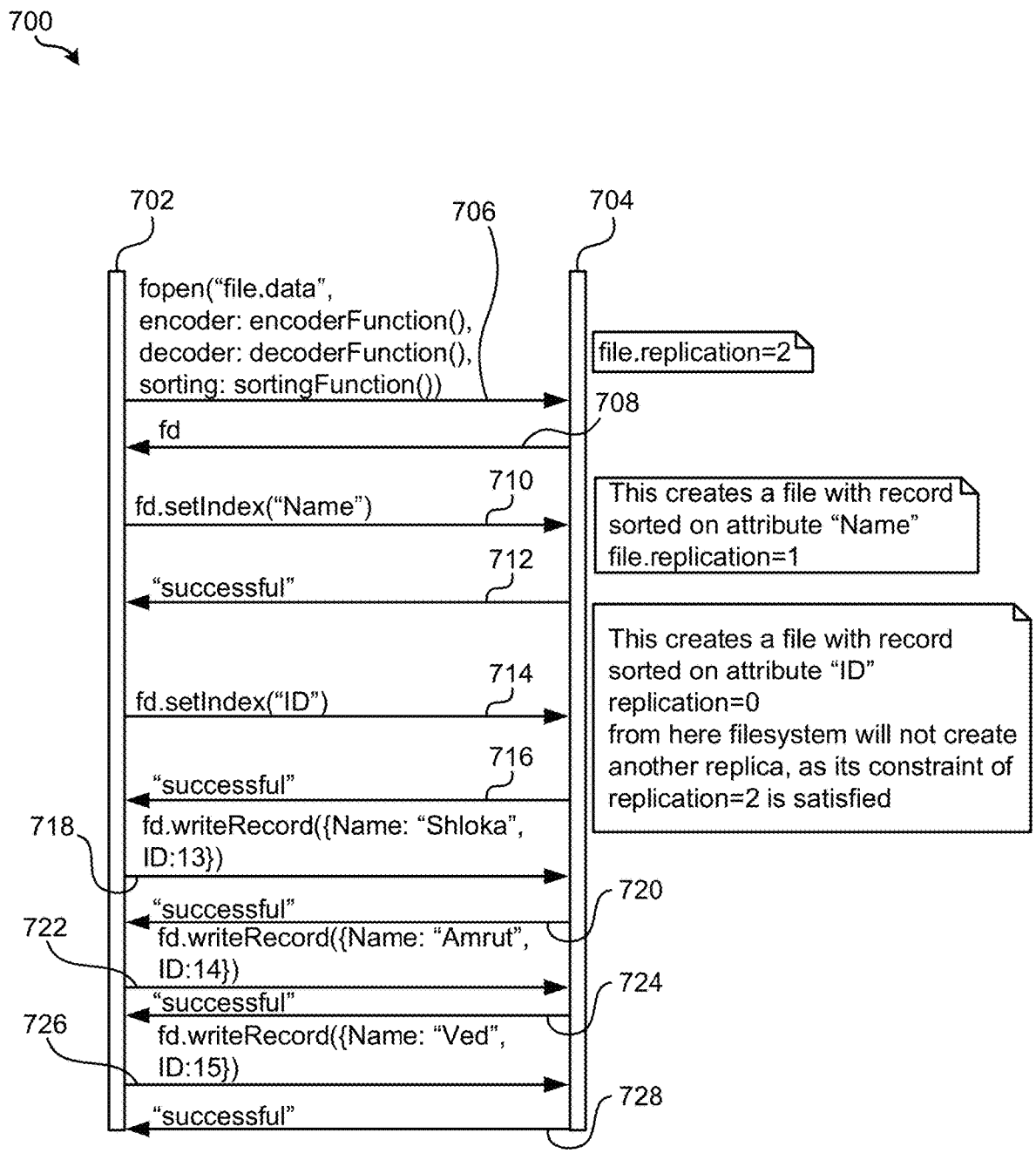
FIG. 7 is a flowchart of a method, in accordance with one embodiment.

Now referring to FIG. 7, a flowchart of a method 700 is shown according to one embodiment. The method 700 may be performed in accordance with the present invention in any of the environments depicted in FIGS. 1-6B, among others, in various embodiments. Of course, more or fewer operations than those specifically described in FIG. 7 may be included in method 700, as would be understood by one of skill in the art upon reading the present descriptions.

Each of the steps of the method 700 may be performed by any suitable component of the operating environment. For example, in various embodiments, the method 700 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

It may be prefaced that the flowchart of FIG. 7 may represent a modified application 702 and a filesystem 704, e.g., via a filesystem interface, for an fwrite call. In operation 706, the application executes at least one command, e.g., see fopen("file.data", encoder: encoderFunction( ), decoder: decoderFunction( ), sorting: sortingFunction( )). In the current approach, it may be assumed that the replication factor of the filesystem is two, e.g., see file.replication=2. A fd command is received by the application 702 from the filesystem 704 in operation 708. In response to receiving the fd command from the filesystem 704, the application executes an fd command in operation 710, e.g., see fd.setIndex("Name"). This creates a file with a record sorted on attribute "Name" file.replication=1. A notification that reports that the file is successfully created is received by the application 702 from the filesystem 704 in operation 712. In operation 714 the application 702 outputs an fd command, e.g., fd.setIndex("ID"). In some approaches, this operation creates a file with a record sorted on attribute "ID" with replication equal to zero. From here filesystem may not create another replica, as its constraint of replication is equal to two is satisfied. A notification that reports that the file has been successfully created is received by the application 702 from the filesystem 704 in operation 716. Operation 718 includes executing an fd command, e.g., see fd.writeRecord ({Name: "Shloka", ID:13}). A notification that reports success is received by the application 702 from the filesystem 704 in operation 720. Similarly, in operation 722, an fd command is executed by the application 702, e.g., see fd.writeRecord({Name: "Amrut", ID:14}). A notification that reports success is received by the application 702 from the filesystem 704 in operation 724. Moreover, in operation 726, an fd command is executed by the application 702, e.g., see fd.writeRecord({Name: "Ved", ID:15}). A notification that reports success is received by the application 702 from the filesystem 704 in operation 728.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   determining patterns of an application that utilizes a filesystem and/or properties of queries of the application, wherein data of the filesystem is stored across a plurality of replication sites of a data storage system;
   based on the determined patterns of the application and/or the determined properties of the queries of the application, estimating a utility of storing at least some of the data of the filesystem, not already stored in different variations at more than one of the replication sites, in the different variations at more than one of the replication sites;
   comparing the estimated utility against a predetermined utility threshold; and
   in response to a determination that the estimated utility is greater than the predetermined utility threshold, modifying a write system call offered by the filesystem to store the at least some of the data in at least some of the different variations at more than one of the replication sites.

2. The computer-implemented method of claim 1, comprising:
   storing the at least some of the data of the filesystem in the at least some of the different variations at the more than one of the replication sites,
   wherein each of the at least some of the different variations of the data is stored with differentiating metadata to be used for reconstructing the variation of the data stored at another one of the replication sites, wherein the differentiating metadata stored with a first variation of the data stored on a first of the replication sites identifies differences between the first variation of the data and a second variation of the data stored on a second of the replication sites;
   outputting a scheduler interface to the application, wherein the scheduler interface is configured to hint a location to read data for a set of the queries of the application; and
   instructing the scheduler interface to be used for sending a read system call to one of the replication sites having a variation of the data stored thereon that fulfills the read system call.

3. The computer-implemented method of claim 1, wherein estimating the utility of storing at least some of the data of the filesystem in the different variations at more than one of the replication sites includes: determining whether the data fulfills a first set of the queries while the data is in a first variation stored on a first of the replication sites and fulfills a second set of the queries while the data is in a second variation stored on a second of the replication sites, wherein the estimated utility is determined to be greater than the predetermined utility threshold in response to a determination that the data fulfills the first set of the queries while the data is in the first variation and fulfills the second set of the queries while the data is in the second variation, wherein the data in the first variation is stored in a different parseable format than a parseable format that the data in the second variation is stored in.

4. The computer-implemented method of claim 1, wherein the estimated utility is based on time complexities associated with reading and writing the at least some of the data of the filesystem in the different variations at more than one of the replication sites and storage complexities associated with storing the at least some of the data of the filesystem in the different variations at more than one of the replication sites.

5. The computer-implemented method of claim 1, wherein the determined patterns of the application are selected from the group consisting of: determined characteristics of the application, a determined input/output (I/O) nature of the application and determined replication properties of the filesystem, and estimated times that it takes for the application to access the data from the different replication sites.

6. The computer-implemented method of claim 1, wherein determining the properties of the queries of the application includes: determining a minimum amount of the data an answer to at least one of the queries includes, and determining an average time that responding to the queries consumes.

7. The computer-implemented method of claim 1, comprising: in response to a determination that the estimated utility is less than or equal to the predetermined utility threshold, storing copies of the at least some data at more than one of the replication sites.

8. A computer program product, the computer program product comprising a computer readable storage medium having program instructions embodied therewith, the program instructions readable and/or executable by a computer to cause the computer to:
  determine, by the computer, patterns of an application that utilizes a filesystem and/or properties of queries of the application, wherein data of the filesystem is stored across a plurality of replication sites of a data storage system;
  based on the determined patterns of the application and/or the determined properties of the queries of the application, estimate, by the computer, a utility of storing at least some of the data of the filesystem, not already stored in different variations at more than one of the replication sites, in the different variations at more than one of the replication sites;
  compare, by the computer, the estimated utility against a predetermined utility threshold to determine whether to modify a write system call offered by the filesystem to store the at least some of the data of the filesystem in different variations at more than one of the replication sites; and
  in response to a determination that the estimated utility is greater than the predetermined utility threshold, modify, by the computer, the write system call offered by the filesystem to store the at least some of the data in the at least some of the different variations at more than one of the replication sites.

9. The computer program product of claim 8, the program instructions readable and/or executable by the computer to cause the computer to:
  store, by the computer, the at least some of the data of the filesystem in the at least some of the different variations at the more than one of the replication sites,
  wherein each of the at least some of the different variations of the data is stored with differentiating metadata to be used for reconstructing the variation of the data stored at another one of the replication sites;
  output, by the computer, a scheduler interface to the application, wherein the scheduler interface is configured to hint a location to read data for a set of the queries of the application; and
  instruct, by the computer, the scheduler interface to be used for sending a read system call to one of the replication sites having a variation of the data stored thereon that fulfills the read system call.

10. The computer program product of claim 8, wherein estimating the utility of storing at least some of the data of the filesystem in the different variations at more than one of the replication sites includes: determining whether the data fulfills a first set of the queries while the data is in a first variation stored on a first of the replication sites and fulfills a second set of the queries while the data is in a second variation stored on a second of the replication sites, wherein the estimated utility is determined to be greater than the predetermined utility threshold in response to a determination that the data fulfills the first set of the queries while the data is in the first variation and fulfills the second set of the queries while the data is in the second variation.

11. The computer program product of claim 8, wherein the estimated utility is based on time complexities associated with reading and writing the at least some of the data of the filesystem in the different variations at more than one of the replication sites and storage complexities associated with storing the at least some of the data of the filesystem in the different variations at more than one of the replication sites.

12. The computer program product of claim 8, wherein the determined patterns of the application are selected from the group consisting of: determined characteristics of the application, a determined input/output (I/O) nature of the application and determined replication properties of the filesystem, and estimated times that it takes for the application to access the data from the different replication sites.

13. The computer program product of claim 8, wherein determining the properties of the queries of the application includes: determining a minimum amount of the data an answer to at least one of the queries includes, and determining an average time that responding to the queries consumes.

14. The computer program product of claim 8, the program instructions readable and/or executable by the computer to cause the computer to: in response to a determination that the estimated utility is less than or equal to the predetermined utility threshold, store, by the computer, copies of the at least some data at more than one of the replication sites.

15. A system, comprising:
  a processor; and
  logic integrated with the processor, executable by the processor, or integrated with and executable by the processor, the logic being configured to:
  determine patterns of an application that utilizes a filesystem and/or properties of queries of the application, wherein data of the filesystem is stored across a plurality of replication sites of a data storage system;
  based on the determined patterns of the application and/or the determined properties of the queries of the application, estimate a utility of storing at least some of the data of the filesystem, not already stored in different variations at more than one of the replication sites, in the different variations at more than one of the replication sites, wherein the different variations include at least a first variation and a second variation;
  compare the estimated utility against a predetermined utility threshold; and
  in response to a determination that the estimated utility is greater than the predetermined utility threshold, modify a write system call offered by the filesystem to store the data in different variations at more than one of the replication sites.

16. The system of claim 15, the logic being configured to:
  store the at least some of the data of the filesystem in the different variations at the more than one of the replication sites,
  wherein each of the different variations of the data is stored with differentiating metadata to be used for reconstructing the variation of the data stored at another one of the replication sites;
  output a scheduler interface to the application, wherein the scheduler interface is configured to hint a location to read data for a set of the queries of the application; and
  instruct the scheduler interface to be used for sending a read system call to one of the replication sites having a variation of the data stored thereon that fulfills the read system call.

17. The system of claim 15, wherein estimating the utility of storing at least some of the data of the filesystem in different variations at more than one of the replication sites includes: determining whether the data fulfills a first set of the queries while the data is in the first variation stored on a first of the replication sites and fulfills a second set of the queries while the data is in the second variation stored on a second of the replication sites, wherein the estimated utility is determined to be greater than the predetermined utility threshold in response to a determination that the data fulfills the first set of the queries while the data is in the first variation and fulfills the second set of the queries while the data is in the second variation.

18. The system of claim 15, wherein the estimated utility is based on time complexities associated with reading and writing the at least some of the data of the filesystem in different variations at more than one of the replication sites and storage complexities associated with storing the at least some of the data of the filesystem in different variations at more than one of the replication sites.

19. The system of claim 15, wherein the determined patterns of the application are selected from the group consisting of: determined characteristics of the application, a determined input/output (I/O) nature of the application and determined replication properties of the filesystem, and estimated times that it takes for the application to access the data from the different replication sites.

20. The system of claim 15, wherein determining the properties of the queries of the application includes: determining a minimum amount of the data an answer to at least one of the queries includes, and determining an average time that responding to the queries consumes.

\* \* \* \* \*